US006531256B1

(12) United States Patent
Bedells et al.

(10) Patent No.: US 6,531,256 B1
(45) Date of Patent: Mar. 11, 2003

(54) PROCESS FOR MAKING PARTICULATE COMPOSITIONS

(75) Inventors: Alison Dawn Bedells, Manchester (GB); Daniel Patrick Morris, Manchester (GB); Kumar Abhinava, Stirlingshire (GB); Martin Russell Edwards, Manchester (GB); William Malcolm Logan Wood, Huddersfield (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/423,052

(22) PCT Filed: Apr. 1, 1998

(86) PCT No.: PCT/GB98/00964

§ 371 (c)(1),
(2), (4) Date: Jan. 10, 2000

(87) PCT Pub. No.: WO98/50828

PCT Pub. Date: Nov. 12, 1998

(30) Foreign Application Priority Data

May 1, 1997 (GB) .............................................. 9708815

(51) Int. Cl.$^7$ ................................................ C08J 3/215
(52) U.S. Cl. .................................. 430/137.14; 523/335
(58) Field of Search ................................. 430/137, 109, 430/137.14; 523/335

(56) References Cited

U.S. PATENT DOCUMENTS

| | | | | |
|---|---|---|---|---|
| 5,308,734 A | * | 5/1994 | Sacripante et al. | 430/137 |
| 5,348,832 A | * | 9/1994 | Sacripante et al. | 430/137 |
| 5,403,693 A | * | 4/1995 | Patel et al. | 430/137 |
| 5,525,452 A | | 6/1996 | Hopper et al. | |
| 5,593,807 A | | 1/1997 | Sacripante et al. | |
| 5,650,256 A | * | 7/1997 | Veregin et al. | 430/137 |
| 5,660,965 A | * | 8/1997 | Mychajlowskij et al. | 430/137 |

FOREIGN PATENT DOCUMENTS

| | | |
|---|---|---|
| EP | 0 261 686 | 3/1988 |
| EP | 0 602 871 A1 | 6/1994 |
| GB | 2 305 926 | 4/1997 |

* cited by examiner

*Primary Examiner*—Christopher Rodee
(74) *Attorney, Agent, or Firm*—Pillsbury Winthrop LLP

(57) ABSTRACT

There is described a process for producing a particulate composition comprising the steps of:

(a) forming a first dispersion comprising first particles stabilised in a first fluid by a first species in an initial state, the first species changeable between the initial state and a further state, where the initial state provides (directly or indirectly) more stability to the particles within the dispersion than the further state;

(b) optionally the step of forming a second dispersion comprising second particles stabilised in a second fluid, miscible with the first fluid, by a second species in the, or another, initial state, the second species also changeable between the, or another ,initial state and the, or another, further state, where said initial state provides (directly or indirectly) more stability to the particles within the dispersion than said further state;

(c) after the optional step of mixing the first and second dispersions together if the second dispersion was formed in step b), changing the state(s) of the first and/or optionally second species from the initial state (s) to the further state(s) substantially to induce association between the dispersed particles to form clusters; and (d) binding together the particles within the clusters.

A preferred embodiment of the process comprises mixing together two aqueous dispersions of particles (e.g. pigment particles with particles of latex polymer formed by emulsion polymerisation). The dispersions are stabilised by ionic surfactants of same sign charge. Association of the particles into clusters is induced by adjusting pH to selectively protonate or deprotonate the surfactants. The clusters are grown by aggregation into loose matrices which are fused together to form particles which can be used in electroreprographic toners.

11 Claims, No Drawings

PROCESS FOR MAKING PARTICULATE COMPOSITIONS

This application is the national phase of international application PCT/GB98/00964 filed Apr. 1, 1998 which designated the U.S.

The present invention relates to a process for making particulate compositions. Such compositions have particular utility in the field of electroreprography. Preferred aspects of the invention relate to processes for making toner compositions for use in electroreprography.

Electroreprography is any process in which an image is reproduced by means of electricity and incident radiation, usually electromagnetic radiation, more usually visible light. Electroreprography comprises the technology of electrophotography which encompasses photocopying and laser printing technologies. In both these technologies a latent, electrostatic image is produced, in charge, by exposure of a photoconductive drum to light. The exposure can either be from light reflected from an illuminated image (photocopying) or from a laser which scans the drum, usually under instruction from a computer (laser printing). Once a latent image has been produced in charge it must be developed to form a visible image on the drum which can then be transferred onto a suitable substrate so a hard copy of the image is obtained (e.g. by printing onto paper).

Suitable developers, which may be liquid or dry compositions, comprise particles of a toner which are electrostatically attracted to the latent image. Liquid developers comprise a toner dispersed in a suitable insulating liquid. Dry developers may comprise single component systems comprising a toner, or two component systems which comprise a mixture of a toner and a carrier. A toner may comprise particles of a polymeric component, a colouring agent and optionally other internal and/or external additives such as charge control agents and/or surface additives to improve the flowability of the toner particles. The polymeric component of the toner is electrically insulating to enable the toner to be electrostatically charged during the electroreprographic process. The polymer also acts to fix the toner to the printed substrate, usually by fusion of the polymer onto the substrate by heating. The colouring agent, which is usually a pigment, imparts the required colour to the toner.

During use in an electroreprographic device, friction between particles of toner with their carrier and/or with parts of the device, cause the toner particles to become charged with an electrostatic charge (tribocharge). The exact mechanism which produces the toner image will then vary according to the specific device used. For example in a conventional photocopier the toner composition may be formulated so that tribocharged toner particles will be opposite in sign to the latent image on the drum. Thus toner will be attracted to the latent image on the drum to develop, on the drum, an image in toner which corresponds to the original document. The developed image is then transferred to a substrate such as paper (e.g. by a pressure roller and/or voltage). The transferred image is then fixed to the substrate (e.g. by heat, pressure and/or suitable solvents) to produce a hard copy of the image. The image drum is then cleaned and the device is ready to produce the next copy. Thus developer compositions are used both to develop the latent image on the drum and to produce the final hard copy.

There are a number of methods for making toners. The most common method is to mix the polymer and optional other ingredients (e.g. colorant) together by kneading in a ball mill above the melting temperature of the resin. The optional ingredients may be added simultaneously or sequentially to the resin before or after melting the resin, but are generally added to the resin when molten. Generally, this involves mixing the molten composition for several hours at temperatures from 120° C. to 200° C., in order to uniformly distribute any optional ingredients (if present) throughout the toner resin. The resultant melt may then be cooled, extruded and then formed into particles with a mean diameter of typically below 20 μm. The particle formation is achieved by physical processes such as crushing, grinding, milling, and/or pulverising the extrudate. The fine powder of toner or toner-resin so obtained is either used directly, is diluted with an inert solid as carrier, and/or is coated with surface additives such as silica by mixing for example in a suitable blending machine.

As well as being extremely energy intensive, such physical processes result in a wide distribution of particle sizes within the toner. This leads to significant disadvantages. A wide particle size range generates more uneven tribocharge within the toner which leads to an uneven print density in the final image. The fine dust within such toner compositions leads to fogging of the image produced and more readily contaminates the interior of the device in which the toner is used. The presence of larger toner particles reduces the resolution of images that may be developed with the toner. Methods for classifying this wide particle size (such as air classification or sieving) are wasteful of the rejected material. If material outside the required size range is recycled this also adds to the cost.

Modern electroreprographic devices require toners (and processes for making them) which avoid some or all of the preceding disadvantages and exhibit some or all of the properties listed below which are desired in toners (and processes for making them). Ideally a toner image can be fixed onto the printed substrate at low temperature and toner fusion occurs over a wide temperature range. Conveniently toners produce little contamination of the device in which they are used. Desired toners generate tribocharge at a controlled level, which is stable with time and which is reasonably independent of either temperature or humidity. Toners with a small particle size (preferably <7 μm) and narrow size distribution provide good image resolution. Toners should be cheap to produce in large volumes. It is also desirable that colorant(s) and other additives [e.g. charge control agents (CCAs) and waxes] can be dispersed uniformly in a toner. Ideal toners can produce images which are matt or gloss as required; have a high optical density; a wide colour gamut; and/or are resistant to smudging and smearing. These properties are strongly influenced by the choice of toner resins. It is not feasible or cost effective to produce a toner having these parameters using the conventional extrusion and milling processes described above.

Therefore to overcome these disadvantages, methods for chemically producing toners have been developed in which the toner particles are prepared by chemical processes such as aggregation or suspension rather than being abraded from much larger sized materials by physical processes. Chemically produced toners made by prior art suspension methods are unsatisfactory as it is difficult to control particle shape or obtain a narrow distribution of particle size using these suspension routes. Aggregation provides a greater degree of control of the properties of resultant toner particles such as size distribution, particle shape and/or particle composition.

Certain prior art applications (for example JP 2-259770, JP 2-259771, JP 2-11968, JP 2-061650 and JP 2-093659 [Kokai] and U.S. Pat. No. 4,983,488, U.S. Pat. No. 5,066,560 and EP 0162577 all to Hitachi) disclose methods for chemical production of toners using an irreversible coagulation method for particle growth. JP 2-061650 is typical of these and describes mixing aqueous dispersions of latex and a pigment followed by a coagulation step. These Hitachi patents all describe use of coagulating agents, such as suitable salts, which reduce the stability of the colloid to irreversibly form a semi-solid gelatinous mass. These processes do not readily control particle growth, indeed the coagulated solids have to be further sized and/or classified (e.g. by milling and sieving) to produce particles of the desired size which negates one of the advantages of chemically producing toners.

The mechanism of the Hitachi processes is as follows. In a colloid stabilised by charged surfactants, surrounding each dispersed particle in the continuous (typically aqueous) phase there will be a so called 'double layer' where counter ions (of opposite charge to the net charge on the particle) will be in excess. The degree to which the counter ions are in excess will decrease with increasing distance from the dispersed particle. The thickness of this double layer will be determined by the rate at which the net charge decreases with distance from the particle which is dependent on (inter alia) the ionic strength of the colloid. The colloid will only be stable whilst the ionic repulsion between these double layers keeps the dispersed particles a sufficient distance apart for short range attractive forces (such as van der Waals forces) to be insignificant. If the double layer is too thin the dispersed particles can approach sufficiently closely for these attractive forces to predominate. Thus altering the ionic strength of the colloid will effect the thickness of the double layer and hence the stability of the colloid. When the ionic strength is raised to a particular amount the double layer is so thin there is effectively no ionic repulsion between particles and the forces between the particles are purely attractive which leads to the formation of a large solid mass. Hence adding a suitable ionic salt to a colloid (often called 'salting out') will, at a certain concentration, suddenly produce an irreversible, catastrophic collapse of the dispersed particles into a distinct gelatinous clot or mass.

EP 0225476, EP 0609443, EP 0302939, all in the name of Nippon Carbide, describe various processes for chemically producing toners in which aggregation is induced (for example by heating).

Various patent applications all in the name of Xerox (e.g. EP 0631196, EP 0631057, EP 0631197, EP 0631194, EP 0671664, EP 0631195, GB 2279464, GB 2279465 and GB 2269179) describe modifications of a process for chemically producing toners in which dispersions stabilised with opposite charged surfactants are mixed together to start aggregation. Typical of these applications is EP 0631196 (Xerox) which describes a process for preparing a toner by aggregation of a mixture of an aqueous suspension of a pigment stabilised with ionic surfactant and an aqueous suspension of a latex stabilised with an ionic surfactant of opposite charge to that stabilising the pigment. The oppositely charged surfactants cause the pigment and latex particles to associate into clusters of particles immediately the dispersions are mixed. The clusters are grown by heating. Once the desired cluster size has been reached further aggregation is minimised by adding additional surfactant to stabilise the suspension of clusters. Then the particle clusters are fused together by heating the mixture above the glass transition temperature ($T_g$) of the latex to form irregularly shaped toner particles comprising pigment and latex which can be collected.

In these processes the different dispersed particles begin to associate as soon as the dispersions mix. The amount of association is controlled by the ratio of cationic to anionic functionality between the two surfactants which must be balanced with the required ratio of the two different particle components. The ratio of the two surfactants must be chosen carefully otherwise less than satisfactory mixing of the ingredients can occur. This may cause an uneven distribution of ingredients within the particles of the final product.

It can been seen therefore that none of the preceding aggregation methods are entirely satisfactory. It is an object of the present invention to provide an improved process for chemically producing particulate compositions, such as toners, which overcomes some or all of the problems identified with the prior art processes and particles made by them and produces particulate compositions with some or all of the advantages described previously.

The present invention relates to improved processes for producing particulate compositions (such as chemically produced toners) in which the local stabilisation of each particle within the liquid can be controlled. Stabilisation arises mainly from local interaction between species at the surface of the dispersed particles (e.g. surfactants adsorbed onto the particles' surface). If local forces generated between particles can be more effectively controlled the degree of association between particles can be regulated and the properties of the final particulate composition (e.g. toner) can be optimised.

Therefore broadly in accordance with one aspect of the present invention there is provided a process for producing a particulate composition comprising the steps of:

(a) forming a first dispersion comprising first particles stabilised in a first fluid by a first species in an initial state, the first species changeable between the initial state and a further state, where the initial state provides (directly or indirectly) more stability to the particles within the dispersion than the further state;

(b) optionally the step of forming a second dispersion comprising second particles stabilised in a second fluid, miscible with the first fluid, by a second species in the, or another, initial state, the second species also changeable between the, or another, initial state and the, or another, further state, where said initial state provides (directly or indirectly) more stability to the particles within the dispersion than said further state;

(c) after the optional step of mixing the first and second dispersions together if the second dispersion was formed from step b), changing the state(s) of the first and/or optionally second species from the initial state (s) to the further state(s) substantially to induce association between the dispersed particles to form clusters; and (d) binding together the particles within the clusters.

Preferably the particulate composition produced by the above method is electroreprographically effective. More preferably the above process produces a composition which (optionally after further finishing steps) can be used as a toner and/or developer composition for an electroreprographic imaging device. The term 'electroreprographically effective' (for example with reference to the toners, compositions, ingredients and/or processes described herein) will be understood to mean effective for use in an electroreprographic method by providing the required properties to a toner and/or developer, by being compatible with the carriers and/or diluents suitable for formulating such toners and/or developers (for example those described herein), by being compatible with electroreprographic devices (such as photo-copiers and/or laser printers) and/or by being capable of being printed in such devices. Preferably to be acceptable for use in electroreprography ingredients are Ames negative.

Unless the context clearly indicates otherwise, as used herein, plural forms of the terms herein are to be construed as including the singular form and vice versa.

Although the particulate compositions produced by the process of the invention have particular utility as toners for use in electroreprography, they may also be useful where compositions comprising small particles of narrow size distribution and known chemical composition would also be advantageous, for example in catalysis.

The initial states of the first and/or second species provide more dispersion stability to the dispersed particles within the respective first and second fluids than the corresponding further states of the first and/or second species. This differential stability between the two states may be achieved directly or indirectly. In the direct mechanism the initial state of each species may simply be more effective at dispersing than its further state. In the indirect mechanism another (fixed) dispersion stabilising means may exist to aid dispersion of the particles in first and/or second fluids. This other (fixed) dispersion stabiliser does not change (or not in a manner which might substantially effect its dispersion stabilising qualities) under the conditions which would convert the initial state to the further state on each species. In the indirect mechanism the further state of each species is more effective than its initial state at counteracting the dispersing effect of the other (fixed) dispersion stabiliser. For example if the fixed dispersant is an ionic surfactant (which relies on charge for its dispersing effect) the further state could exhibit a larger charge of a sign opposite to that exhibited by the fixed dispersion stabiliser compared to the initial state.

Thus it can been seen that in either the direct or indirect case, the overall effect would be the same as a change from the initial to the further state on the first and/or second species acts to de-stabilise the respective dispersion and encourages the particles dispersed therein to associate.

In step c) optionally, after association has occurred for a selected period, the first and/or optionally second species may be altered from the further state back to the initial state, substantially to inhibit further association between the particles. Preferably the association in step (c) comprises aggregation and/or flocculation.

Optionally the processes of the present invention may also comprise the following additional growth process in step c):
(i) inducing, optionally by heating and/or agitation, growth of the clusters formed by association into dispersed matrices of loosely associated clusters; and
(ii) optionally once the desired matrix size has been achieved, substantially reducing further growth by suitable means, for example by adding non-ionic and/or ionic surfactant and/or changing pH.

The further state of the first and/or optional second species may be selected to destabilise the particle dispersion. Suitable mechanisms for converting the initial state to the further state and vice versa may comprise any suitable method for example ionisation/deionisation, protonation/deprotonation, radical formation, steric and/or conformational changes and any mixtures thereof. The change may be induced by any suitable means for example a chemical process (e.g. adjusting pH) and/or a physical process (e.g. absorption of suitable radiation).

Preferably the second dispersion is used in the process of the present invention. The corresponding changeable states on the first and second species (i.e. the initial/other initial state; and the further/other further state) may be independent of each other in each respective species, so there may be different pairs of interchanging initial and further states on the first and second species. However preferably the pair of initial and further states in steps a) and b) are changeable by substantially the same mechanism and/or in substantially the same way. Thus particle association in step c) can be initiated by the same or similar means to change both the first species and the second species from their respective initial states into their respective further states which are less dispersion stable. More preferably the first and second species in steps a) and b) can form a similar or substantially identical pair of changeable initial and further states.

The first and second species may be the same or different. The initial and further states of the first and second species may be the same or different if the first and second species are the same. As mentioned above the initial and further states of the first and second species may correspond or be equivalent in some way if the first and second species are different, or the initial and further states of each species may be entirely different. The mechanism by which the initial and further states of each species interchange may be the same, similar, or completely different, but preferably they can both be performed by the same operation to more easily induce cluster growth in step c).

Preferably the first and optional second species form part of the particles' surface. The species may be directly bonded to the surface (e.g. by forming part of the material [such as a polymer] from which the particle is formed. The species may also be more loosely associated with the particle surface (e.g. by absorption, adsorption, physisorption and/or chemisorption to the surface such as a suitable surfactant)

Preferably in the process of the present invention (the steps labelled as above) preferred features comprise:
(a) forming a first dispersion comprising first particles stabilised in a first fluid by a reversibly ionisable or de-ionisable first species;
(b) optionally forming a second dispersion comprising second particles stabilised in a second fluid, miscible with the first fluid, by a reversibly ionisable or de-ionisable second species optionally different to the first species;
(c) altering the ionisation state of the first and/or optionally second species, substantially to induce association between the particles to form clusters;
(d) heating the mixture at a temperature which causes the particles within each cluster substantially to fuse together; and the additional step of
(e) collecting the fused clusters to form a particulate composition.

Thus in this preferred aspect of the present invention the initial state(s) and the further state(s) exhibit different ionic charge (which may include neutral charge) from each other. The initial state(s) may be any changeable ionised or de-ionised state on the first and/or second species which improves the stability of the dispersion (relative to the respective further state). The further state(s) may be a corresponding de-ionised or ionised state on the first and/or second species which reduces the stability of the dispersion (relative to the respective initial state).

A further optional step between steps b) and c) above comprises mixing the first and optionally second dispersions to obtain a substantially homogeneous mixture without substantial association in which the first and optional second species exist in the initial state (i.e. the more dispersion-stabilising state) substantially to inhibit association.

A still further optional feature after mixing the dispersion from steps a) and b) is that the resultant mixture may be heated to a higher temperature to aid homogeneous dispersion of the mixture. In such a case growth may occur in step (c) without further heating but simply by mixing of the particle dispersion with changed ionisation. If the dispersed particles comprise polymers the mixing temperature may be substantially about (below or above) the glass transition temperature (Tg) of any constituent polymers. Thus for example in the preferred methods described below the first and second dispersions (e.g. pigment and latex dispersions) are mixed after having been heated to the growth temperature, or just below. Preferably this mixture in step 'c)' is stirred and heated at a temperature in a range from about 30° C. below to about 30° C. above (preferably about ±20° C., more preferably about ±10° C.) the $T_g$ of any constituent polymers (e.g. the latex) substantially to induce growth of the pigment/polymer clusters particles to form matrices. The temperature of the mixture in step (c) will preferably be in the range from about 30° C. to about 80° C.

The advantage of heating is that the viscosity of the associated mixture never reaches too a high level. The reasons for this are not known. However, without wishing to be bound by any theory, it may be because at a higher mixing temperature some cluster growth occurs during association; and/or perhaps because the viscosity of the gel is lower at higher temperature.

A further preferred aspect of the present invention (the steps labelled as above) comprises:

(a) forming a first dispersion comprising first particles dispersed in a first fluid, stabilised by a first ionic species;

(b) optionally forming a second dispersion comprising second particles dispersed in a second fluid, miscible with the first fluid, stabilised by a second ionic species having a charge of the same sign as the first ionic species;

(c) mixing the first and optionally second dispersions to obtain a substantially homogeneous mixture without substantial association; and reducing the stability of the dispersed particles in the homogenised mixture, substantially to induce association between the particles to form clusters.

A preferred process of the present invention uses first and second species of the same sign charge to produce an optionally coloured toner composition. In this process the initial state is an ionic charge of the same sign (hence all the particles are mutually repulsive) and the further state is of a neutral charge (hence all the particles are not mutually repulsive). Thus this process (the steps labelled as above) further comprises:

(a) forming a first aqueous dispersion comprising pigmentary particles stabilised by a reversibly ionisable or de-ionisable first species;

(b) forming a second aqueous dispersion comprising polymer particles stabilised by a reversibly ionisable or de-ionisable second species optionally different to the first species, the second species and the first species capable of exhibiting an ionic charge of the same sign;

(c) mixing the first and second dispersions to obtain a substantially homogeneous mixture in the absence of substantial association; adjusting the ionisation state of the first and/or second species, so the net electric charge on the first and second particles is not substantially mutually repulsive, and association between the first and second particles to form clusters can be substantially induced; then inducing by heating growth of the clusters formed by association into dispersed matrices of loosely associated clusters;

(d) heating the reaction mixture from step 'c)' at a temperature above the glass transition temperature of the constituent polymers to fuse together the clustered particles to form internally coalesced particles of an optionally coloured toner; and (e) collecting the optionally coloured particulate toner obtained from step 'f)' to produce, after optional washing, drying and/or blending with other suitable ingredients, an optionally coloured toner composition.

If the above toner is not coloured (colourless) the pigmentary particles, in step (a) above, may comprise colourless additives (such as magnetic additives). In the above process the initial state could also be of neutral charge (hence all the particles are not mutually attractive) in which case the further state could comprise ionic charge of a different sign on the first and second species (hence the first and second particles would be mutually attractive, although they would repel themselves). The first and/or second stabilising species may be supplemented by further optional stabilising species which may or may not be switchable.

A preferred process of the present invention (pH switching) produces coloured (which includes black) toner compositions. This process (the steps labelled as above) further comprises:

(a) forming a first aqueous dispersion comprising pigmentary particles stabilised by a reversibly protonatable or deprotonatable first species;

(b) forming a second aqueous dispersion comprising polymer particles stabilised by a reversibly protonatable or deprotonatable second species optionally different to the first species;

(c) mixing the first and second dispersions under conditions where the net electric charge on the particles is not substantially mutually attractive, to obtain a substantially homogeneous mixture in the absence of substantial association; adjusting the pH of the mixture to alter the protonation state of the first and/or second species, so the net electric charge on the first and second particles is not substantially mutually repulsive, and association between the first and second particles to form clusters is substantially induced; then inducing by heating growth of the clusters formed by association into dispersed matrices of loosely associated clusters;

(d) heating the reaction mixture from step 'c)' at a temperature above the glass transition temperature of the constituent polymers to fuse together the clustered particles to form particles of a coloured toner; and (e) collecting the coloured particulate toner obtained from step 'd)' to produce, after optional washing, drying and/or blending with other electroreprographically effective ingredients, a coloured toner composition.

In a further feature of the present invention the applicant has discovered that when the particles from steps (a) and/or (b) comprise a polar functional group this facilitates the binding of the particles in step (d). (for example by controlling fusion e.g. by heating). Preferably the polar group comprises other than an acid and/or basic polar group, more preferably comprises at least one hydroxy group, non-acidic polar group and/or non-basic polar group, most preferably comprises one or more hydroxy and/or ether groups (e.g. is PEG functionality and/or alkylene glycol alkyl ether).

If the particles from steps (a) and/or (b) comprises one or more polymers it is advantageous if at least one of such polymers comprise polar groups (preferably those described above) to control the particle binding in step (d). In particular the polymer which may be a homo or co polymer may comprise hydroxy or other polar functional groups. A preferred hydroxy-functional polymer is an hydroxy functional latex copolymer optionally prepared by emulsion polymerisation. Preferred polar-functional polymers, which do not comprise an hydroxy group, yet which are also suitable for controlling fusion comprise: polymeric alkylene glycol alkyl ethers: for example poly(ethylene glycol)monomethyl ether acrylate and/or methacrylate; and/or poly(propylene glycol) monomethyl ether acrylate and/or methacrylate.

Copolymers may be prepared by copolymerising (e.g. by emulsion polymerisation) an hydroxy-functional and/or other polar-functional polymer precursor (preferably a monomer) with other polymer precursors (e.g. other monomers) to form particles of copolymer (e.g. copolymers of stryene, butyl acrylate and an hydroxy functional monomer). Preferably the hydroxy functional monomer is present in the copolymer in an amount from about 0.1% to about 10% w/w, preferably from about 1 to about 5% w/w to be useful for controlling the fusion process. Suitable hydroxy-functional polymers and/or polymer percursors for making them comprise: 2-hydroxyethyl acrylate and/or methacrylate; hydroxypropyl and/or hydroxybutyl acrylates and/or methacrylates; poly(ethylene glycol) mono acrylates and/or methacrylates; and/or poly (propylene glycol) mono acrylates and/or methacrylates.

The advantage of using polar functional particles (preferably hydroxy-functional copolymers) in the process of the present invention is to control the fusion process. In step (c) particles of non-functional polymers associate and grow well. They also fuse easily, in the sense that coalescence occurs readily. However with such polymers it is more difficult to maintain the particle size distribution, as "gritting" occurs. Very high levels of polar functionality (e.g. >10%) give good particle size stability, but the coalescence rate may be low. Intermediate levels of such functionality (from about 2% to about 10%) are found to give good particle size control and adequate coalescence rates.

The processes of the present invention produces particulate compositions having particles with a size distribution which is readily controllable and lies within a narrow range. The present processes avoid the need for further energy intensive milling or classification steps. The processes allow precise control over the final particle size and economically produce small particles in good yield with a low level of fines. Such small particles are ideal for use in toners where small particle size leads to images of improved resolution. Toner compositions produced by the processes of the present invention may be any colour including black.

Preferably the first ionisable/de-ionisable ionic species comprises a first ionic surfactant and/or a first ionic functionality in the pigmentary particle. The first ionic functionality may comprise a suitable monomer if the pigmentary particles comprises any polymeric ingredients. More preferably the first ionic species comprises the first ionic surfactant.

Preferably the second ionisable/de-ionisable species comprises a second ionic surfactant optionally different to any first surfactant and/or a second suitable ionic functional monomer in the polymer particle optionally different to any first suitable ionic functionality in the pigmentary particle. More preferably the second ionic species comprises the second ionic surfactant.

In one alternative of the present invention in step 'c)' the ionisation of the first and second ionic species are selected (e.g. by choice of pH) so that the ionic forces between them may be adjusted to be substantially mutually attractive. In step c) the association may be substantially started by altering the ionisation state (e.g. by adjusting pH) to switch on the charge so the first and second ionic species have an ionic charge of mutually opposite sign. This introduces long-range inter-particle ionic attraction between the pigmentary and polymer particles which encourages them to approach more closely to a distance where short range attractive forces (such as van der Waals attraction) predominate.

The advantage of using first and second ionic species which initially have a charge of the same sign is when the dispersions are initially mixed together in step 'c)' all the components are stabilised with species (such as surfactants) which are mutually repulsive (because they have the same sign charge). Thus all the ingredients can initially be blended together and mixed well before the ionisation state is altered in step 'c)' (e.g. by adjusting pH) to remove the mutual repulsion and allow the association to begin. This pre-homogenisation step improves incorporation of all the different ingredients within the clusters, and improves yield and homogeneity within the final toner. Optional ingredients may also be more easily added during association, before growth and fusion.

More preferably the first and second species (which may comprise ionic surfactants) are selected because they exhibit differential protonation. Thus at a certain pH they will exhibit charge of the opposite sign and at another pH they exhibit charge of the same sign. Thus in step c) the first and second dispersions may be thoroughly homogenised at a pH where the ionic species exhibit the same sign charge. Hence the particles to which the first and second species are attached (either by being part of the polymeric backbone or by virtue of being a surfactant absorbed onto the particle surface) also experience the long range mutually repulsive forces. Association in step c) can then be induced. The pH may be adjusted to a particular value where due to differential protonation the first and second species exhibit ionic charge of different sign. In that case long-range ionic attractive forces would exist between the different particles. Mutual attraction between the first and second particles encourages rapid association. Once the particles approach closely the short range attractive forces (e.g. van der Waals forces) help to bind the particles into small clusters.

An optional step between step c) [growth of the particles into clusters] and step d) [fusion of the particle clusters] is to stabilise the particle size distribution before raising the temperature to effect fusion. There are two methods which may achieve this, which can be operated separately or together. The first method is the addition of extra surfactant which may be ionic or non-ionic, although ionic surfactant has been found to work better. The second method is re-ionising the switchable surfactant (e.g. by adjusting pH). This increases the overall charge of the same sign on each cluster which enlarges the repulsive forces between the clusters and inhibits further growth. Both methods enable the particle size to be stabilised.

The second method (re-ionising surfactant) is generally advantageous over the first method (adding extra surfactant) as there is less surfactant to wash out from the product. It is desirable to remove any surfactant which may remain on the particles as otherwise the tribocharge level of the resultant toner is likely to be humidity dependant. However, sometimes the use of the second method alone (re-ionising surfactant) may lead to low coalescence rates. If this is the case both stabilisation methods can be used together as if an extra surfactant is also added prior to fusion this will enhance the coalescence rate. However less surfactant will be needed to stabilise the particle size than if method one was used alone.

If an acid switchable surfactant is used in steps (a) and (b) and growth is stabilised by adding more surfactant (i.e.

without solely relying on re-ionising the existing surfactant), then the pH of the mixture before the fusion step (d) could be anywhere within a much broader range, preferably in the range from about 2 to about 8. If particle stability is to be achieved solely by re-ionising the existing surfactant then the pH is preferably in the range from about 4 to about 8. Similar considerations apply when a base switchable surfactant is used in steps (a) and (b).

A further option in the present process is to add before the association step c), a species which may generate, in-situ, a means to effect the inter-conversion of the first and/or second species between their respective initial and further states. The inter-conversion means may be particular process conditions and/or external stimuli, such as electromagnetic radiation, preferably UV and/or visible light. Such species may be materials which generate acid and/or base groups in-situ under the process conditions and/or in response to external stimuli. For example, materials which hydrolyse to form acid (or base) functionality (as appropriate) effectively act as a latent acid or base. Such a latent acid is polyphosphoric acid. The advantage of using an latent inter-conversion means (e.g. a latent acid or base) is that such a latent material does not initially interact with the particles and so can be well mixed within the dispersions from steps a) and/or b). The local environment surrounding each particle is more likely to comprise latent material when it is well-homogenised in the mixture. Thus when the latent material is converted (e.g. by hydrolysis) into its active form, it will more efficiently change the local environment (e.g. pH) surrounding each particle and more effectively convert the initial state into the further state to reduce the dispersion stability (e.g. by reducing surfactant effectiveness). This will initiate a more rapid association of the particles. The disadvantage of adding such a latent material (e.g. a latent pH adjuster) is that parameters which effect conversion of the initial and further states (e.g. pH) may continue to adjust during the process. This could reduce the control of the final particle size distribution.

Preferably the process of the present invention directly produces toner particles substantially of a size (as defined herein) from about 2 $\mu$m to about 20 $\mu$m, more preferably from about 3 $\mu$m to about 15 $\mu$m, most preferably from about 5 $\mu$m to about 10 $\mu$m. Preferably 80% of the particles fall within the preceding size ranges, more preferably 90%, most preferably 95%. Toner with a mean particle size of 5 $\mu$m or below may have particular utility for high resolution printing.

The particle size given herein is a linear dimension corresponding to the diameter of a sphere approximately of same volume as the particular particle of interest which may be substantially irregular in shape.

It might be thought naively that pH control of the association process of the present invention might arise because of the increase in ionic strength on changing pH which might produce effects on the bulk colloid analogous to coagulation. However this has been demonstrated not to be the case and the process of the present invention has been shown to arise because of reversible ionisation (preferably protonation) of the ionic species.

When a cationic species without a removable proton (a quaternary alkyl ammonium salt) comprises the first or second ionic species in the present process, the dispersed particles do not associate under basic conditions which would associate particles stabilised with a deprotonatable substituted ammonium cation (formed from a tertiary amine) as the first or second ionic species, even where there is the same change in ionic strength for both systems. Also the applicant has found that systems stabilised by amine salts will only associate by the addition of base not acid. This strongly suggests that association is induced by removal of a proton from the substituted ammonium cation to form the neutral amine. This provides less repulsion between the particles which thus readily associate.

Similarly when a species which is non-protonatable except under extremely low pH (e.g. a sulphonate, which has a very low pKa) comprises the first and/or second ionic species in the present process the dispersed particles do not associate under acidic conditions which would associate particles stabilised with a protonatable carboxylate salt as the first or second species, even where there is the same change in ionic strength for both systems. Also the applicant has found that systems stabilised by carboxylate salts only associate by the addition of acid not base. This strongly suggests that association is induced by addition of a proton to the carboxylate salt to form the neutral carboxylic acid. This provides less repulsion between the particles which thus readily associate.

Thus, without wishing to be bound by any theory, it is believed that the aforementioned evidence indicates that control of particle association in the preferred processes of the present invention is a pH effect and is not due to changes in the ionic strength of the bulk mixture. Control arises from the local change of ionisation state (by protonation and/or de-protonation) of the dispersion-stabilising species attached to the particles.

It can be seen therefore that the process of the present invention provides a high degree of flexibility in the choice of resin components and colorants as a wide variety of combinations of surfactants can be used. Preferably the present invention uses pH to alter the charge on the surfactants which stabilise the dispersed particles, for example by deprotonating a cation formed from a suitable amine or protonating an anion formed from a suitable acid. This provides a method for more exactly controlling the particle size distribution, which can thus be readily and inexpensively optimised depending on the ingredients used and the properties desired for the final toner product.

The dispersion of pigmentary particles in step 'a)' may consist only of a dispersion of pigment; or may comprise a mixture of pigment and polymer for example as produced by one of more of the following methods. The colorant comprising the pigmentary particles may be any colour including black, and may comprise dye(s) [which are substantially soluble in the medium to which they are added] and/or pigment(s) [which are substantially insoluble in the medium to which they are added].

An aqueous dispersion of pigmentary particles may be produced by a solution dispersion process in the following way. A polymer (e.g. polyester) is dissolved in an organic solvent. Preferably the solvent used should be immiscible with water; dissolve the polymer and/or be removable by distillation relatively easily. Suitable solvents comprise xylene, ethyl acetate and/or methylene chloride. To this solution is added a colorant, either a pigment or a dye. If a dye is used this is simply dissolved in the polymer solution to produce a coloured liquid solution. If a pigment is used it may be added, preferably with one or more suitable pigment dispersants (which may be ionic or non-ionic). The pigment can be milled in the polymer solution to produce a coloured liquid dispersion. Other optional additives such as charge control agents and waxes may be added to the liquid (either dissolved or dispersed in the solvent).

The coloured liquid is added to an aqueous solution comprising the protonatable and/or deprotonatable first ionic species (preferably a surfactant) and is mixed thoroughly (e.g. under high shear) to generate an emulsion. The first and/or second stabilising species may be supplemented by further optional stabilising species which may or may not be switchable between an initial and a further state. The emulsion comprises a dispersed phase comprising droplets of the coloured organic liquid (e.g. particles of solid pigment dispersed in the polymer solution) dispersed within the continuous aqueous phase of the emulsion. Preferably the droplets formed have a diameter of particle size from about 0.1 µm to about 3.0 µm. The droplets of coloured organic liquid are stabilised in the aqueous phase by the first ionic species.

The organic solvent is then removed from the dispersed phase by distillation to leave an aqueous dispersion of pigmentary particles containing the colorant dispersed or dissolved within the solid polymer, the dispersed phase being stabilised in the aqueous phase by the first ionic surfactant. The dispersed pigmentary particles can be used as the raw material in step a) and preferably have a particle diameter of from about 60 nm to about 2 µm, more preferably from about 100 nm to about 2 µm. The size of the pigmentary particles may be controlled by the amount of ionic species and the degree of mixing of the emulsion.

The dispersion of pigmentary particles in step (a) may also be prepared by emulsion polymerisation to form a latex (e.g. using a mixture of stryene and acrylic monomers). The colorant may be incorporated into the latex in various ways, for example by any of the following methods and/or combinations thereof. An aqueous dispersion of pure pigment and/or coloured polymer (e.g. pigmented or dyed polymer produced by the solution dispersion process described above) may be used as the seed for polymerisation. Alternatively a dye (optionally dissolved in a solvent) may be added to the latex followed by heating. Another method is to perform the emulsion polymerisation in the presence of a dye which preferably is co-polymerisable with the monomers used to form the latex.

Optionally any of the coloured polymer particles made as described above can be self agglomerated alone, without the polymer dispersion in step (b).

Preferably the polymer dispersion in step (b) comprises an optionally colourless latex formed by a conventional emulsion polymerisation process (e.g. using a mixture of stryene and acrylic monomers). Several emulsion polymers can be made, for example those with different molecular weight distributions, and these can then be blended prior to use of the polymer blend in the process of the invention.

One advantage of preparing two dispersions in both steps (a) and (b), mixing them and then associating the dispersed mixture is that toner particles can be obtained with a wider range of polymeric and other ingredients than if a single dispersion is used. Different ingredients may be used in each separate dispersion, that may otherwise be incompatible or difficult to formulate within the same toner resin. For example polymers prepared by the above solution dispersion method preferred for step (a) may not be readily prepared by the above emulsion polymerisation method preferred in step (b) and vice versa. Using mixtures of different polymer types also gives greater opportunity to adjust the properties of the final toner, which are strongly influenced by the choice of polymer(s).

The particles may be collected in step (g) by any convenient conventional method for example centrifugation, micro-filtration, freeze drying and/or spray drying.

Especially preferred processes of the present invention will now be described.

A first more preferred process of the present invention comprises one or more preferably all, of the following features described herein in steps (a), (b), (c1), (c2), (c3), (c4) (d) and/or (e):

(a) the first dispersion comprises an aqueous dispersion of pigment dispersed by the first species which comprises a first cationic surfactant comprising an acidic salt of a base (e.g. of a tertiary amine), optionally where the initial state comprises a positively charged quarternary ammonium cation (QAC); and the further state comprises a less positively charged form thereof, more optionally a neutral amine;

(b) the second dispersion comprises a latex polymer formed in situ by emulsion polymerisation, the polymer dispersed by the second species which comprises a second cationic surfactant comprising an acid salt of a base (e.g. of a tertiary amine), optionally where the initial state comprises a positively charged QAC and the further state comprises a less positively charged form thereof, more optionally a neutral amine; (c) in step (c)

(c1) the first and second dispersions are mixed together under conditions of high shear optionally whilst being heated at a temperature in the range about ±10° C. from the $T_g$ of the latex, to obtain a substantially homogeneous mixture without substantial association;

(c2) the pH of the homogeneous mixture produced in step (c1) is raised by adding a base (preferably a base selected from one or more of: optionally substituted ammonia, alkali metal hydroxide, alkali metal carbonate and mixtures thereof; more preferably from $NH_3$ NaOH, KOH and/or $K_2CO_3$) to substantially convert the cations of the first and second surfactants to the less positively charged forms, optionally the neutral amines;

(c3) the mixture from step (c2) is stirred, and optionally heated at a temperature in the range about ±10° C. from the $T_g$ of the latex, substantially to induce growth of the clusters of pigment and latex particles to form cluster matrices;

(c4) optionally when the matrices from step (c3) reach the desired average size further steps (i) and/or (ii) are performed to reduce substantially further growth of the matrices:

(i) a stabiliser is added, selected from one or more of any of the following including mixtures thereof: ionic and/or non-ionic surfactant(s); organic dispersant(s) [e.g. poly(vinyl alcohol), and/or cellulosic polymers] and inorganic dispersant (s) [e.g. calcium phosphate and/or silica]; and/or (ii) the pH of the mixture is lowered by adding an acid (preferably an acid selected from one or more of: sulphuric, hydrochloric, nitric and phosphoric acids and mixtures thereof) substantially to convert the less positively charged forms of the first and second surfactants (e.g. the neutral amines) to the cations;

(d) the dispersion of matrices obtained from step (c4) is heated at a fusion temperature above the $T_g$ of the polymer to fuse together the individual particles within each matrix to form irregularly shaped toner particles comprising the latex and the pigment; and (e) the toner particles obtained from step (d) are recovered from the water, washed and dried and then optionally blended with a flow additive (such as hydrophobic silica).

A second more preferred process of the invention is similar to the first process described above except that;

in steps (a) and (b) above the first and second surfactant comprise respective first and second anionic surfactant(s) which comprise a basic salt of an acid (e.g. of a carboxylic acid);

in step (c2) the pH of the mixture is lowered by adding an acid to convert the negatively charged anions (e.g. carboxylate anions) of the first and second surfactants into less negatively charged forms (e.g. the neutral carboxylic acids); and in optional step (c4ii) the pH of the mixture is raised by adding a base to convert the less negatively charged forms (e.g. the neutral carboxylic acids) of the first and second surfactants into the anions.

In this second more preferred process those acids and bases which are preferred in respective steps (c2 for acid) and (c4ii for base) may be selected from those preferred acids and bases listed above in the first more preferred process in steps (c4ii for acid) and (c2 for base) respectively.

In the first and second more preferred processes described above the first and second surfactants in each process may be the same or different. These ionic surfactants may comprise univalent or polyvalent acid or basic groups and may comprise a plurality of acid or basic groups. If the initial state exhibits multiple ionic charge, the further state need not be a neutral species (e.g. a neutral amine or carboxylic acid molecule) but may be partially neutralised so it exhibits some (but less) charge than the polyvalent ion of the initial state. Such a partially neutralised (less charged) further state would be less effective at (ionically) stabilising the dispersion than the multi-charged initial state and therefore switching surfactants between such states would be effective at destabilising and/or stabilising dispersions in the process of present invention.

In a third more preferred process of the invention the dispersed particles additionally comprise an absorbed non-protonatable or de-protonatable ionic surfactant (which is permanently charged under the process conditions) and the first and/or second species comprises an acid or basic functional monomer on the particle surface which, with an adjustment of pH, may form an ion of the opposite sign charge to the permanently charged ionic surfactant. This will reduce the net charge on the particle and thus reduce the stabilising effect of the surfactant.

For example a dispersed polymer particle may incorporate a carboxylic acid functional monomer and be stabilised by a cationic surfactant containing a quaternary amine group. At low pH the net charge on the particle will be positive and would arise from the cationic surfactant only as the acid monomer is uncharged. When base is added to raise the pH the carboxylate salt is formed which neutralises the cationic surfactant as the quaternary alkyl salt is not pH switchable. Thus the particle, although zwitterionic, now has a lower overall charge and the stabilising effect of the surfactant has been reduced at high pH.

On the other hand, for example, a dispersed polymer particle may incorporate a tertiary amine functional monomer and be stabilised by an anionic surfactant containing a sulphonate group. At high pH the net charge on the particle will be negative arising from the anionic surfactant only as the amine monomer is uncharged. When acid is added to lower the pH the alkyl ammonium salt is formed which neutralises the anionic surfactant as, because the sulphonate group has a low pKa, it is not protonated under anything other than the strongest acidic conditions. Thus the particle, although zwitterionic, now has a lower overall charge and the stabilising effect of the surfactant has been reduced at low pH.

In principle the association step (c) could be carried out in the same vessel in which dispersions from steps (a) and (b) are initially mixed, provided the vessel is equipped with both a high shear mixer and a bulk agitator. In practice, two methods are preferred, a circulation system and a single pass system.

In the circulation system the mixture of the dispersions from steps (a) and (b) (optionally heated to around the polymer Tg, see below) are pumped in a loop from the stirred tank past an external high shear mixer and back into the reaction vessel. Particle association is effected by adjusting the pH by adding acid (or base) into the stream just before the high shear head and/or reaction vessel.

In the single pass method the mixture of the dispersions from steps (a) and (b) are pumped from one (optionally heated) reaction vessel to another reaction vessel past the high shear head. The pH is adjusted by adding acid (or base) simultaneously at the required rate, again just before the shear head and/or reaction vessel.

A further aspect of the present invention comprises particles obtained and/or obtainable by any of the processes of the present invention as described herein. Preferably particulate compositions of the present invention comprise those which are electroreprographically effective (e.g. toner and/or developer compositions). Preferred toners exhibit the particles sizes described herein. Preferred developers further comprise an electroreprographically effective, inert carrier and/or diluent (for example those described herein). The carrier and/or diluent may comprise particles of a size substantially in the range from about 20 $\mu$m to about 100 $\mu$m.

A still further aspect of the present invention provides an electroreprographic device (e.g. a device for colour and/or black and white printing such as a photocopier, laser printer and/or fax machine), a component for said device and/or a consumable useable with said device; any of which comprise a composition obtainable by any of the processes of the invention as described herein.

Compositions of the present invention may exist sealed within an electroreprographic device and/or any component thereof (e.g. spare part and/or replaceable mechanical element) which may or may not be sold separately from the whole device. More commonly, compositions of the present invention are sold separately from the devices and other components thereof as a consumable for use in the device. Consumables useable with these devices may comprise cartridges comprising toners and/or developers of the present invention which may be liquid and/or solid. The cartridges may be sealed, disposable cartridges (which are pre-filled and used once) or may be re-fillable, re-cyclable cartridges (which can be emptied and/or filled by the user and/or sent to the manufacturer of the device or a third party for re-filling). The cartridges may be removable (wholly or in part) from the device; may be shaped to fit in a particular device or a generic device; and may also comprise other parts of the mechanism of the device in which they are used. The cartridges may comprise a single storage compartment for dispensing monochrome toner (e.g. black) or may comprise a plurality of storage compartments for use in devices which can print partial or full colour images. Thus a cartridge with four compartments may dispense a three colour trichomat plus black. Less commonly a cartridge with three compartments may suffice if the black is to be formed by combining the three colours of the trichromat.

A yet further aspect of the present invention provides use of a composition obtainable as described herein, in the manufacture of a electroreprographic device, as a component for said device and/or as consumable for use with said device.

Toners of the present invention preferably comprise a resin as a binder. The terms resin and polymer are used herein interchangeably as there is no technical difference between them. Other ingredients which optionally may be added to a toner compositions comprise one or more of the following and any suitable mixtures thereof: colorants, magnetic additives, charge control agents, waxes and/or other additives to improve the flow, charge, fusing and/or transfer properties of the toner and/or to aid cleaning of the device (e.g. image drum) in which the toner is used.

Switchable waxes (e.g. those which are protonatable and/or de-protonatable by adjusting pH) can also be used in the association process of the invention. The switchable properties can be introduced either by: use of an aqueous wax dispersion where the wax is stabilised by a switchable surfactant; or use of an acid-functional wax, e.g. an ethylene/acrylic acid copolymer.

The toner resin may comprise any thermoplastic resin which can be used to prepare electroreprographically effective toner compositions. Preferably the toner resin comprises one or more of the following: a styrene and/or substituted styrene polymer, (such as homopolymer [for example polystyrene] and/or copolymer [for example styrenebutadiene copolymer and/or styrene-acrylic copolymer {e.g. a styrene-butyl methacrylate copolymer and/or polymers made from stryene-butyl acrylate and other acrylic monomers such as hydroxy acrylates or hydroxy methacylates}]); polyesters (such as specially alkoxylated bis-phenol based polyester resins [for example those described in U.S. Pat. No. 5,143,809]), polyvinyl acetate, polyalkenes, poly(vinyl chloride), polyurethanes, polyamides, silicones, epoxy resins and phenolic resins. The toner resins may be optionally cross-linked (e.g. to provide the required melt rheology). Therefore multi-functional monomers may be added (e.g. during polymerisation) to the toner resin to make cross-linked polymer particles (e.g. monomers such as di- or tri-functional acrylates or methacrylates and/or divinylbenzene can be added to a styrene-acrylic copolymer). Chain transfer agents may be added to the toner resin to reduce the molecular weight (e.g. thiols can be added to stryene-acrylic resins). The toner resins may also be modified (e.g. at any suitable time before, during and/or after polymerisation) by other conventional methods well-known to a polymer chemist to achieve particularly desired properties. Further examples of the aforementioned resins and other resins also effective for use in toners are given in the book "Electrophotography" by R. M. Shafert (Focal Press) and in the following patents or patent applications: GB 2,090,008, U.S. Pat. No. 4,206,064 and U.S. Pat. No. 4,407,924. It is especially preferred that the toner resin is compatible with any optional colorant used so it is easier to formulate in such resins and produce clear, durable and bright reprographic images. Preferably, the temperature at which the resin melts lies in the range between about 120° C. and about 220° C. and more preferably between about 140° C. and about 180° C. However certain resins (e.g. some resins used for coloured toners) may have a lower melting temperature.

The term colorant as used herein encompasses both dyes (which are substantially soluble in the medium to which they are added) and pigments (which are substantially insoluble in the medium to which they are added). A colorant comprises any material which is imparts colour to a medium by any mechanism, for example by attenuation, absorption, reflection and/or scattering of radiation in the region of the electromagnetic spectrum visible to the human eye. Colour as used herein encompasses black, white and greys as well as hues such as red green and blue. For example colour can arise by chemical processes (e.g. absorption, re-radiation, phosphorescence and/or fluorescence), physical processes (e.g. scattering of radiation by particles similar in size to the wavelength of the incident radiation) and/or by any other processes. The terms colorant and colour as used herein unless the context indicates differently may also include materials which have their effect in the region of the electromagnetic spectrum which is non-visible to the human eye (such as infra red or ultra-violet radiation). Such invisible colorants may have application where toners of low (or no) visibility are desired (e.g. for security marking and anti-counterfeiting measures for high value articles such as currency).

The colorant may where appropriate [e.g. within the pigmentary particles of step (a)] comprise a dye (soluble in the medium to which it is added) and/or a pigment (insoluble in the medium to which it is added). Dyes may comprise disperse dyes which are dispersible in one solvent (e.g. water) but which become soluble in another (e.g. within the resin once the toner particle has fused). For toner applications either dyes or pigments may be used, each having different advantages.

Some of the advantages of using dyes over pigments to provide colour in toners comprise any of the following: less quantities of dye are required; there is less likely to be a negative influence on tribocharging efficiency; more brilliant colours can be obtained leading to better colour mixing and a wide colour gamut; a typical absorbance/reflectance spectra of a dye comprises sharp narrow peaks; the images produced are less grainy; the melting point and/or viscosity of toners may be lower; dyes may be chemically modified to alter toner properties; and dyes may be easily purified. Some of the advantages of using pigments over dyes to provide colour in toners comprise any of the following: little bleeding or blooming problems in the image; improved light and solvent fastness; higher thermal stability; high extinction coefficients especially for particles below 100 nm in diameter; and greater chemical inertness.

One of the advantages of the process of the present invention is that toner particles can be readily produced which comprise both dye(s) and pigment(s) with the advantages of both colorants. Alternatively as a greater variety of different colorants can be used in the present process the specific colorant(s) chosen can be selected to optimise more exactly the properties of a toner for a specific use.

If the toner is black (for producing black and white images) a suitable colorant may comprise carbon back pigment. Coloured toners (e.g. for use in colour copies and colour laser printers) may comprise a trichromatic set of toners, each toner in the trichromatic toner set preferably comprising a toner resin and respectively a cyan colorant, a magenta colorant and a yellow colorant. Conventional colorants for colour toners are described, for example, in U.S. Pat. No. 5,102,764; U.S. Pat. No. 5,032,483 and EP 0,159, 166. Other suitable colorants for use in toner compositions may be selected from one or more of the following and any suitable mixtures thereof: ferrite, magnetite, metallised phthalocyanines (e.g. copper or nickel phthalocyanines, also known as Pc, which are blue), quinacridone, perylene, benzidine, nigrosine, aniline, quinoline, anthraquinone, azo disperse dye (e.g. azo pyridones, also known as AP, which are yellow), benzodifuranones (also known as BDF, e.g. those which are red), metallised lake pigments;. water insoluble or soluble basic dyes (especially the water soluble triphenylmethane dyestuff); xanthenes; monoazo and/or disazo pigments; diarylides; benzimidazolones; isolindolines; isoindolinones; and any mixtures thereof. The toner composition may contain up to 20% colorant, preferably from about 0.1% to about 10%, more preferably from about 0.5% to about 10% and most preferably from about 1% to about 8% by weight of the toner composition.

Colorants for use in toner compositions generally have good heat and light fastness together with low bleed characteristics on the substrate to which they are applied. Preferably the colorant is tinctorially strong, easy to use and is available in a wide variety of derivatives to expand the shade gamut. More preferably the colorant is stable in the processing conditions encountered on formulation, exhibits good stability and fastness when applied to a substrate and has a disposition in colour space which provides a wide and useful gamut of shades from a small number of colorants. Generally the colorant comprises a pigment, however the colorant may also comprise a dye, preferably disperse dyestuffs or solvent-soluble dyestuffs.

The colorant may comprise a magnetic additive (e.g. ferrite and/or magnetite) optionally mixed with a coloured pigment, in which case the colorant is preferably present from about 5% to about 70%, more preferably from about 10% to about 50%, by weight of the toner composition. Mixtures of carbon black and magnetite are available commercially; preferably where carbon black is present from about 1% to about 15%, more preferably from about 2% to about 6%, based on the weight of carbon black and magnetite.

If is often advantageous to produce toners which can be readily detected by a suitable artificial means (e.g. a detector). It may also be desirable (e.g. for security applications) that any ingredients added to aid detection by the artificial means and/or the whole toner are substantially invisible to the naked eye. Therefore, in such a case the colorants herein may be replaced by, or comprise, additives which impart suitable properties to the optionally 'invisible' toner to cause it to be detectable by the artificial means, yet which are themselves substantially invisible or weakly visible to the unaided human eye. Such additives may comprise one or more suitable: magnetic additive, ultraviolet absorber; infra-red absorber; phosphorescent material; fluorescent material; and/or suitable mixtures thereof.

It may be advantageous for certain toners of the invention to be transparent, for example where the toner is used to produce an optionally coloured image on a clear substrate through which light is projected (such as in printing onto transparencies for use on an overhead projector). Where transparency is desirable the toner may comprise small sized particles of pigment within the toner. Therefore to produce such transparent toners the particles in the pigment dispersion used in the preferred methods of the invention [e.g. in step (a)] may be small, preferably with a mean particle size diameter of less than about 300 nm.

Toners comprising a (visible or invisible) magnetic additive may be useful to print items for use in methods such as magnetic ink character recognition (MICR). MICR is used to machine process large volumes of printed data (e.g. cheques). Chemically produced toners of the present invention which are also magnetic are particularly useful in MICR as the controlled particle size leads to sharper printed images and less tendency for the machine to detect incorrectly or fail to read the original image. Thus MICR toners of the present invention reduce the error rate in high volume applications. For certain applications (e.g. cheques) security may also be an issue. The magnetic properties of an item printed using a magnetic toner are not readily detectable to the user. Thus a person who attempts to make an illicit copy will use a conventional (non-magnetic) toner and the magnetic properties of the original will not be readily reproduced by conventional copying methods. Therefore MICR can also be used to distinguish between originals and illicit copies.

Coloured toners are of use in electroreprography for producing colour images on sheet or film material, especially paper and transparencies (e.g. those made from plastics materials such as polyester and acetate for example for use as overhead transparencies). Particularly useful colour toners are those which exhibit bright and intense colours and produce images with good fastness properties, these are especially useful for laser printing on paper.

It can been seen that it is desirable for toner compositions to comprise particles which can possess readily an electrostatic charge (tribocharge) so they can be attracted to the latent image on the drum to develop the latent image. Toners which readily tribocharge may also have the further advantage of facilitating rapid and more complete removal of any residual toner from the image drum (e.g. by electrostatic repulsion). This may improve image quality (by reducing ghost images from previous copies) and may reduce the cycle time between copies and thus increase the speed of copying.

It has been found that the addition of certain charge control agents (hereinafter known as CCAs) to toner compositions helps the production and stability of tribocharge within the toner. Use of CCAs may also lead to improved image quality when the latent image is transferred to the paper. The mechanism for the action of CCAs is unclear, but the industry continues to seek compounds with improved abilities as CCAs. Properties desired in ideal CCAs; toner compositions to which they are added; and/or the hard copies they produce are well known to those skilled in the art. Such properties might comprise any or all of the following: ability to stabilise larger tribocharge; improved tribocharge distribution and/or uniformity of charge within an individual toner particle and/or across the population of toner particles within a toner composition; reduced cost, reduced toxicity or non-toxicity, greater stability under conditions of use, good compatibility with the binder resin in a toner, improved image resolution, greater speed of image production, reduction in print bleed in the hard copy and/or improved colorant properties.

CCAs may be coloured or substantially colourless. Coloured CCAs have utility as the colorant in the toner for example as dyes or pigments depending on the substrate in which they are used. Colourless CCAs have particular utility in non-black coloured toners (such as for colours which have weak shades) where adding colourless CCAs would not substantially alter the colour of the toner to which they are added.

A CCA may be capable of stabilising a positive electrostatic charge (positive charging) and/or negative electrostatic charge (negative charging). Preferred positive charging CCAs comprise amine derivatives, more preferably alkoxylated amines and/or quaternary ammonium compounds, such as cetyl pyridinium chloride or bromide. Preferred negative charging CCAs comprise metal complexes or salts, preferably comprising an aryl moiety, for example a bis azo aryl moiety, more preferably a 2:1 metal complex or salt of a hydroxynaphthoic acid and/or napthenic acid. Complexes of Zn or Cr may also be effective colourless negative charging CCAs (e.g. di tert-butyl salicylate complexes). CCAs may also comprise suitable electron donating dyes (e.g. nigrosine). The substituents on a CCA may be selected to improve the compatibility of the CCA with the toner resins with which they are formulated. Thus, the size and length of the substituents may be selected to optimise the physical entanglement or interlocation with the resin or they may contain reactive entities capable of chemically reacting with the resin.

The amount of CCA in the toner is preferably at least about 0.1%, more preferably at least about 0.5% and most preferably at least about 1% by weight of the toner. The amount of CCA in the toner is desirably up to about 12%, preferably up to about 10% more preferably up to about 5% and especially up to about 3% by weight of the toner.

Preferably toners comprise suitable agents to control particle flow such as one or more of the following: alumina, silica, benzoguanine-formaldehyde resin, hydroxyapatite, fluroresin, acrylic polymer beads, titania and/or any suitable mixtures thereof.

It will be understood that one or more of the ingredients listed herein may be added to the toner compositions of the present invention to serve more than one function. For example magnetite may act as both colorant and magnetic material.

The invention is now further illustrated by the following non-limiting example in which all references to amounts (such as w/w) are to percentages by mass of ingredient to the total mass of the composition to which they are added unless indicated to the contrary.

EXAMPLE 1

(a) Formation of Aqueous Dispersion of Pigment

Ammonia was added to an aqueous solution comprising 63.6 g water and surfactants to adjust the pH of the solution to 8.3. The surfactants used were 2.06 g of Marlowet 4538 (available commercially from Huls Ltd.) and 0.93 g of Solsperse 27000 (available commercially from Zeneca Ltd.) A colorant (18.5 g of Lutetia Blue ENJ, available commercially from Zeneca Ltd.) was then added to the aqueous phase and the mixture was stirred using a bead mill (Dispermat) at about 2000 rpm for 8 hours. The aqueous dispersion of pigment so formed comprised 26.0% w/w solids.

(b) Formation of Aqueous Dispersion of Latex by Emulsion Polymerisation in situ

Ammonia was added to an aqueous solution comprising 8.6% w/w surfactant (Marlowet 4538) to adjust the pH to 8.5. This solution (31.3 g) was added to 523.7 g of water and then heated to 85° C. whilst being stirred. This aqueous solution was held at 85° C. and 1.8 g of a polymerisation initiator (the azo compound available from Wako under the trade designation V501) was added, followed by stryene (36.1 g), butyl acrylate (7.9 g), acrylic acid (9.0 g) and lauryl mercaptan (1.3 g). The mixture was then stirred at 300 rpm over 30 minutes to form a dispersion. Over the next 3½ hours the following ingredients were added simultaneously: i) a mixture of stryene (324.9 g), butyl acrylate (71.1 g), acrylic acid (81 g) and lauryl mercaptan (11.7 g); and ii) a mixture of 125.3 g of the Marlowet 4538 solution (at pH 8.5 prepared as above) with 53.2 g of water and 2.7 g of the azo initiator V501. After these ingredients had been added the emulsion was heated, stirred for a further 70 minutes, then cooled to ambient temperature and filtered to remove large solid impurities. The pH of the filtrate obtained was adjusted to 8.0 with ammonia solution. The latex dispersion so formed comprised 35.8% solids.

(c1) Mixing the Dispersions

The latex emulsion (25.0 g) and the pigment dispersion (1.81 g) obtained above were mixed thoroughly together under high shear with water (51.7 g) to obtain a homogenous mixture.

(c2) Inducing Association

The homogenous mixture from step c) above was stirred under high shear (using an IKA Ultra Turax T-25 high shear mixer) at 10,000 rpm whilst a 2% aqueous solution of HCl was added until the pH of the mixture reached 2.5.

(c3) Cluster Growth

The mixture resulting from step (c2) was heated at 46° C. for two hours whilst being stirred. A 10% aqueous solution of sodium dodecylbenzenesulphonate (4.6 g) was added to the this mixture to prevent further growth.

(d) Fusion

The mixture from step c3) above was then heated at 85° C. for 1¾ hours to fuse the particles together within the matrices.

(e) Collection of Toner Particles

The mixture from step d) above was cooled to 25° C., then filtered to collect the fused particles. The particles were washed by forming a slurry with the particles in water which were then collected by filtration. The slurrying process was repeated with dilute ammonia (3 times) then dilute HCl (once) and finally water. The washed toner particles were dried under reduced pressure at 30° C. The dry toner particles obtained had a mean particle size of 11.30 μm and a geometrical size distribution of 1.28 as determined by a Coulter counter.

EXAMPLE 2

(a) Aqueous Digment Dispersion

A dispersion of Heliogen Blue L7080 (Pigment Blue 15:3, BASF) in water (27.3% solids) was made in a similar manner to the dispersion made in Example 1a) above, using an Eiger bead mill, and the dispersants Akypo RLM100 (10% w/w on the pigment, available commercially from Kao Corporation) and Solsperse 27000 (10% w/w on the pigment).

(b) Latex

A polymer latex was made by emulsion polymerisation, the polymer being made from styrene (82.5%), acrylic ester monomers (15.2%) and 2-hydroxyethyl methacrylate (2.5%). Ammonium persulphate (0.5% w/w of monomers) was used as the initiator and a mixture of thiol chain transfer agents (2.5%) used. The surfactant used in the polymerisation was Akypo RLM100 (3% w/w of monomers). The latex had a solids level of 40%. The Tg of the polymer was 61° C., and a GPC analysis against polystyrene standards determined its Mn as 7,500 and Mw as 23,700.

(c1) Mixing the Dispersions

The latex (677 g), the pigment dispersion (52.2 g) and water (1050 g) were mixed in a stirred tank and heated to 57° C. The stirring speed was 550 rpm. The mixture was then pumped using a peristaltic pump from the tank through a flow cell equipped with an Ultra Turrax T50 high shear mixer operating at 10,000 rpm, and back into the stirred tank.

(c2) Inducing Association

During the circulation a 2% solution of sulphuric acid (120 g) was added over 12 minutes close to the high shear head. The final pH of the associated mixture was 2.1. After 3 minutes further circulation the high shear mixing was stopped and the associated material present in the flow cell pumped back into the stirred tank.

(c3) Cluster Growth

The temperature of the mixture in the tank from step (c2) was raised to 66° C. and the mixture stirred for one hour. The pH was then adjusted to 7.9 with the addition of a 1% solution of sodium hydroxide in water, and the mixture stirred for a further 5 minutes.

(d) Fusion

The temperature of the mixture from (c3) was raised to 92° C. and maintained there for two hours, before cooling to room temperature. Sodium dodecylbenzenesulphonate (2% w/w of toner, added as a 10% solution in water) was then added to a small sample. The mixture was heated at 110° C. for 2 hours under pressure and the sample was subjected to continuous agitation. The resulting blue toner particles had a smooth but non-spherical appearance. Analysis with the Coulter Counter showed a mean volume particle size of 7.2 μm, with a GSD of 1.34. A separate sample was mixed with 2% sodium dodecylbenzenesulphonate as above and fused at 120° C. under pressure for 30 minutes. The resulting toner was spherical in shape. Analysis with the Coulter Counter showed a mean volume particle size of 7.0 pm, with a GSD of 1.30.

EXAMPLE 3

(a) Aaueous Pigment Dispersion

A dispersion of Monolite Rubine 3B (Pigment Red 122, Zeneca) in water (24.6% solids) was made in a similar manner to Example 1a) above, using an Eiger bead mill, and the dispersants Akypo RLM100 (10% w/w of pigment) and Solsperse 27000 (10% w/w/ of pigment).

(b) Latex

The latex was the same as that used in Example 2

(c1) Mixing the Dispersions

The latex (451 g), the pigment dispersion (38.6 g) and water (1310 g) were mixed in a stirred tank and heated to 66° C. The stirring speed was 510 rpm. The mixture was then pumped using a peristaltic pump from the tank through a flow cell equipped with an Ultra Turrax T50 high shear mixer operating at 10,000 rpm, and back into the stirred tank.

(c2) Inducing Association

During the circulation a 2% solution of sulphuric acid (85 g) was added over 10 minutes into the stirred tank. The final pH of the associated mixture was 2.1. The high shear mixing was stopped and the associated material present in the flow cell pumped back into the stirred tank.

(c3) Cluster Growth

The mixture was stirred at 66° C. for one hour, and the pH was then adjusted to 7.7 with the addition of a 1% solution of sodium hydroxide in water.

(d) Fusion

The temperature of the mixture from (c3) was raised to 92° C. and maintained there for two hours, before cooling to room temperature. To a small sample was then added sodium dodecylbenzenesulphonate (2% w/w of toner, added as a 10% solution in water) The mixture was heated at 120° C. for 30 minutes under pressure and the sample was subjected to continuous agitation. The resulting magenta toner particles had a smooth but non-spherical appearance. Analysis with the Coulter Counter showed a mean volume particle size of 8.6 pm, with a GSD of 1.22.

EXAMPLE 4

(a) Aaueous Pigment Dispersion

A dispersion of Pigment Yellow 3G (the pigment Yellow 17 available commercially from Tennants) in water (25.7% solids) was made in a similar manner to Example (1a) above, using an Eiger bead mill, and the dispersants Akypo RLM100 (10% w/w of pigment) and Solsperse 27000 (10% w/w of pigment).

(b) Latex

The latex was the same as that used in Examples 2 and 3.

(c1) Mixinc the Dispersions

The latex (890 g), the pigment dispersion (73 g) and water (1386 g) were mixed in a stirred tank and heated to 66° C.

(c2) Inducing Association

The mixture was then pumped using a peristaltic pump from the tank through a flow cell equipped with an Ultra Turrax T50 high shear mixer operating at 10,000 rpm, and into a separate stirred tank. Simultaneously with this a 2% solution of sulphuric acid (150 g) was injected over 3.5 minutes into the flow cell, close to the high shear head, to mix with the latex and pigment mixture.

(c3) Cluster Growth

The associated mixture was then stirred at 66° C. for one hour and then sodium dodecylbenzenesulphonate (5% w/w of the toner, added as a 10% solution in water) was added.

(d) Fusion

The temperature was then raised to approximately 100° C. and maintained at this temperature for 6 hours, before cooling to room temperature. The resulting yellow toner particles had a smooth but non-spherical appearance. Analysis with the Coulter Counter showed a mean volume particle size of 6.4 pm, with a GSD of 1.25.

EXAMPLE 5

(a) Aaueous Pigment Dispersion

A dispersion of Heliogen Blue L7080 (Pigment Blue 15:3 from BASF) in water (24.2% solids) was made in a similar manner to the above, using an Eiger bead mill, and the dispersants Akypo RLM100 (10% w/w of pigment) and Solsperse 27000 (10% w/w of pigment).

(b) Latex

The latex was the same as that used in Examples 2, 3 and 4.

(c1) Mixing the Dispersions

The latex (891 g), the pigment dispersion (77.5 g) and water (1382 g) were mixed in a stirred tank and heated to 62° C.

(c2) Inducing Association

The mixture was then pumped using a peristaltic pump from the tank through a flow cell equipped with an Ultra Turrax T50 high shear mixer operating at 10,000 rpm, and into a separate stirred tank. Simultaneously with this a 2% solution of sulphuric acid (150 g) was injected over 3.5 minutes into the flow cell, close to the high shear head, to mix with the latex and pigment mixture.

(c3) Cluster Growth

The associated mixture was stirred at 550 rpm and the temperature raised to 68° C. After one hour the pH was raised to 9 with the addition of sodium hydroxide solution.

(d) Fusion

The temperature of the mixture from step 9c3) was raised to 100° C. and stirred for 4 hours. The dispersion was then cooled and transferred to a stirred pressure vessel and the temperature raised to 120° C. The dispersion was stirred at this temperature for one hour, before cooling to room temperature. After 30 minutes the resulting blue toner particles had a smooth, but irregular appearance. Analysis with the Coulter Counter showed a mean volume particle size of 7.4 µm, with a GSD of 1.25. After one hour the particles were nearly spherical, with a mean volume particle size of 7.4 µm and a GSD of 1.26.

What is claimed is:

1. A process for producing a particulate composition comprising:
   (a) forming a first aqueous dispersion comprising pigmentary particles stabilised by a reversibly protonatable or deprotonatable first species, one of the protonated or deprotonated states of said first species providing more stability to the pigmentary particles than the other of said states;
   (b) forming a second aqueous dispersion miscible with the first aqueous dispersion and comprising polymer particles stabilised by a reversibly protonatable or deprotonatable second species, one of the protonated or deprotonated states of said second species providing more stability to the polymer particles than the other of said states;
   (c) mixing the first and second dispersions optionally under conditions where the net electric charge on the particles is not substantially mutually attractive, to obtain a substantially homogeneous mixture in the absence of substantial association;
   adjusting the pH of the mixture to alter the protonation state of the first and/or second species so the net electric charge on the first and second particles is not substantially mutually repulsive and association between the first and second particles to form clusters can be substantially induced; and
   inducing by heating growth of the clusters into dispersed matrices of loosely associated clusters;
   (d) heating the mixture from step (c) at a temperature above the glass transition temperature of the constituent polymers to fuse together the particles within the matrices; and
   (e) collecting the particles obtained from step (d) to produce, after optional washing, drying and/or blending with surface additives, an electroreprographically effective toner.

2. A process as claimed in claim 1, in which:
   (a) the first dispersion comprises an aqueous dispersion of pigment dispersed by the first species which comprises a first cationic surfactant comprising an acidic salt of a base, optionally where the initial state comprises a positive charged quaternary ammonium cation and the further state comprises an uncharged form thereof, one of the optionally positively charged state or the optionally uncharged state of said first species providing more stability to the prigmentary particles than the other of said states;
   (b) the second dispersion comprises a latex polymer formed in situ by emulsion polymerisation, the latex polymer being dispersed by the second species which comprises a second cationic surfactant comprising an acidic salt of a base, optionally where the initial state comprises a positive charged quaternary ammonium cation and the further state comprises an uncharged form thereof, one of the optionally positively charged state or the optionally uncharged state of said second species providing more stability to the polymer particles than the other of said optional states;
   (c) in step (c):
      (c1) the first and second dispersions are mixed together under conditions of high shear, optionally whilst being heated at a temperature in the range about +10° C. from the $T_g$ of the latex; to obtain a substantially homogeneous mixture without substantial association;
      (c2) the pH of the homogeneous mixture produced in step (c1) is raised by adding a base to substantially convert the cations of the first and second surfactants to the less positively charged forms;
      (c3) the mixture from step (c2) is stirred, and optionally heated at a temperature in the range about +10° C. from the $T_g$ of the latex; substantially to induce growth of the clusters of pigment and latex particles to form cluster matrices;
      (c4) optionally when the matrices from step (c3) reach the selected average size further steps (i) and/or (ii) are performed to reduce substantially further growth of the matrices:
         (i) a stabiliser is added, selected from the group consisting of ionic and non-ionic surfactant(s); organic dispersant(s) and inorganic dispersant(s) and mixtures thereof; and/or
         (ii) the pH of the mixture is lowered by adding an acid substantially to convert the uncharged forms of the first and second surfactants, optionally the uncharged forms of the quaternary ammonium cations, to the cations;
   (d) the dispersion of matrices obtained from step (c4) is heated at a fusion temperature above the $T_g$ of the polymer to fuse together the individual particles within each matrix to form irregularly shaped toner particles comprising the latex and the pigment; and
   (e) the toner particles obtained from step (d) are recovered from the water, washed and dried and then optionally blended with a flow additive.

3. A process as claimed in claim 1 in which:
   (a) the first dispersion comprises an aqueous dispersion of pigment dispersed by the first species which comprises a first anionic surfactant comprising a basic salt of an acid, optionally where the initial state comprises a negatively charged carboxylate anion and the further state comprises an uncharged form thereof, one of said negatively charged or uncharged states of said first species providing more stability to the pigmentary particles than the other of said states;
   (b) the second dispersion comprises a latex polymer formed in situ by emulsion polymerisation dispersed by the second species which comprises a second anionic surfactant comprising a basic salt of an acid, optionally where the initial state comprises a negatively charged carboxylate anion and the further state comprises an uncharged form thereof, one of said negatively charged or uncharged states of said second species providing more stability to the polymer particles than the other of said states;
   (c) in step (c):
      (c1) the first and second dispersions are mixed together under conditions of high shear, optionally whilst being heated at a temperature in the range about +10° C. from the $T_g$ of the latex; to obtain a substantially homogeneous mixture without substantial association;
      (c2) the pH of the homogeneous mixture produced in step (c1) is lowered by adding an acid to substantially convert the anions of the first and second surfactants to the less negatively charged forms;

(c3) the mixture from step (c2) is stirred, and optionally heated at a temperature in the range about +10° C. from the $T_g$ of the latex; substantially to induce growth of the clusters of pigment and latex particles to form cluster matrices;

(c4) optionally when the matrices from step (c3) reach the selected average size further steps (i) and/or (ii) are performed to reduce substantially further growth of the matrices:
   (i) a stabiliser is added, selected from the group consisting of ionic and/or non-ionic surfactant(s); organic dispersant(s) and inorganic dispersant(s) and mixtures thereof; and/or
   (ii) the pH of the mixture is raised by adding a base substantially to convert the uncharged forms of the first and second surfactants to the anions;

(d) the dispersion of matrices obtained from step (c4) is heated at a fusion temperature above the $T_g$ of the polymer to fuse together the individual particles within each matrix to form irregularly shaped toner particles comprising the latex and the pigment; and (e) the toner particles obtained from step (d) are recovered from the water, washed and dried and then optionally blended with a flow additive.

4. A process as claimed in claim 1, in which at least one of any constituent polymers in the first and/or second dispersions comprise hydroxy functional groups or other polar functional groups to control the binding of the particles in step (d).

5. A process as claimed in claim 1, in which the steps comprise:

adding before the association step (c), a latent species which may generate in-situ, a means to effect the conversion of the first and/or second species between their respective initial and further states or vice versa, wherein the means to effect conversion comprises an acid or base species.

6. A process as claimed in claim 5, in which the latent species comprises a latent acid or base.

7. A process as claimed in claim 1, in which the steps comprise:

in step (c) during association and optional mixing of the first and second dispersions heating the mixture to aid homogeneous dispersion.

8. A process as claimed in claim 7, wherein during association and optional mixing in step (c) the mixture is heated at a temperature in the range of from about 30° C. to about 80° C.

9. A process for producing a particulate composition comprising:

(a) forming a first dispersion which is a dispersion of solids comprising first particles stabilised in a first fluid by a first species in an initial state, the first species being changeable between the initial state and a further state, where the initial state provides, directly or indirectly, more stability to the particles within the dispersion than the further state, said first dispersion being stabilised with a reversibly ionisable or deionisable first species, wherein the first species comprises a first ionic surfactant;

(b) optionally forming a second dispersion comprising second particles stabilised in a second fluid, miscible with the first fluid, by a second species in the, or another, initial state, the second species also being changeable between the or another initial state and the, or another, further state, where said initial state provides, directly or indirectly, more stability to the particles within the dispersion than said further state, said optional second dispersion being optionally stabilised with a reversibly ionisable or deionisable second species optionally different to the first species;

(c) after optionally mixing the first dispersion with the second dispersion, altering the charge ionisation of the first and/or optionally second species from an initial state to a further state, substantially to induce association between the particles to form clusters, then inducing, by heating, growth of the clusters into dispersed matrices of loosely associated clusters;

(d) heating the mixture at a temperature which causes the particles within each matrix substantially to fuse together; and the additional step of collecting the fused matrices to form a particulate composition.

10. A process as claimed in claim 9, in which the steps comprise:

(a) forming a first aqueous dispersion comprising pigmentary particles stabilised by a reversibly ionisable or de-ionisable first species;

(b) forming a second aqueous dispersion comprising polymer particles stabilised by a reversibly ionisable or de-ionisable second species optionally different to the first species, the second species and the first species capable of exhibiting an ionic charge of the same sign;

(c) mixing the first and second dispersion optionally to obtain a substantially homogeneous mixture in the absence of substantial association and then adjusting the ionisation state of the first and/or second species, so the net electric charge on the first and second particles is not substantially mutually repulsive, and association between the first and second particles to form clusters can be substantially induced; followed by growing the clusters, by heating, into dispersed matrices of loosely associated clusters;

(d) heating the mixture from step (c) at a temperatures above the glass transition temperature of the constituent polymers to fuse together the particles within the matrices; and (e) collecting the particles from step (d) to produce, after optional washing, drying and/or blending with surface additives, an electroreprographically effective toner.

11. A process for producing a particulate composition comprising:

(a) forming a first dispersion which is a dispersion of solids comprising first particles stabilised in a first fluid by a first species in an initial state, the first species being changeable between the initial state and a further state, where the initial state provides, directly or indirectly, more stability to the particles within the dispersion than the further state, said first dispersion being stabilised with a reversibly ionisable or deionisable first species, wherein the first species comprises a first ionic functionality in the pigmentary particle;

(b) optionally forming a second dispersion comprising second particles stabilised in a second fluid, miscible with the first fluid, by a second species in the, or another, initial state, the second species also being changeable between the or another initial state and the, or another, further state, where said initial state provides, directly or indirectly, more stability to the particles within the dispersion than said further state, said optional second dispersion being optionally stabilised with a reversibly ionisable or deionisable second species optionally different to the first species;

(c) after optionally mixing the first dispersion with the second dispersion, altering the charge ionisation of the first and/or optionally second species from an initial state to a further state, substantially to induce association between the particles to form clusters, then inducing, by heating, growth of the clusters into dispersed matrices of loosely associated clusters;

(d) heating the mixture at a temperature which causes the particles within each matrix substantially to fuse together; and the additional step of collecting the fused matrices to form a particulate composition.

* * * * *